Patented Jan. 13, 1942

2,269,893

UNITED STATES PATENT OFFICE 2,269,893

INSECTICIDE

Roscoe H. Carter, Washington, D. C., assignor to Henry A. Wallace as Secretary of Agriculture of the United States of America, and to his successors in office No Drawing. Application June 20, 1940,
Serial No. 341,496

1 Claim. (Cl. 167—33)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to a compound which may be useful as an insecticide. The invention also relates to a method of preparing such a compound.

An object of this invention is to provide an organic sulfur compound containing carbon, nitrogen and oxygen in a heterocyclic ring formation in such a combination that it may be particularly useful as an insecticide.

Di-thiocarbamic acids are the products resulting from the reaction between carbon disulfide and basic amines which contain at least one hydrogen attached to the nitrogen. The di-thiocarbamic acids are unstable and cannot be separated as such. In practice an alkali such as sodium, or potassium hydroxide is also used so that the final product is a metal salt of the di-thiocarbamic acid as for instance sodium di-methyl di-thiocarbamate, a well-known article of commerce.

Tetrahydro 1,4,2-oxazine, commonly known as morpholine is a basic amine, in which the nitrogen is a member of a six membered heterocyclic ring containing also oxygen and carbon. I have found that morpholine and carbon disulfide will react with great violence.

I have further found, however, that when morpholine is dissolved in water and carbon disulfide is added to this solution, the reaction is slowed up so that it proceeds without undue violence and the products of the reaction are available for other uses. I do not intend to specify that water is the only solvent or diluting medium useful for this purpose, as other solvents, including organic liquids, may be used without departing from the spirit of this invention. It is very desirable, however, that non-inflammable liquids be used for this purpose.

I have found that the product of the reaction between an aqueous solution of morpholine and carbon disulfide is a solid, stable, relatively insoluble material having the composition of a morpholine salt of the di-thiocarbamic acid of morpholine. The reaction is as follows:

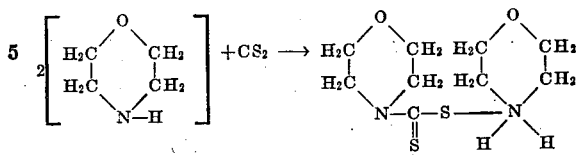

In other words, half of the morpholine is converted to the di-thiocarbamic acid which then combines with the remaining morpholine to form the morpholine salt of the di-thiocarbamic acid of morpholine.

I have found that my compound is formed when 2 mols of morpholine are treated with one mol of carbon disulfide, as illustrated in the equation, and it is also formed when one mol of morpholine is treated with one mol of carbon disulfide. I have also found that when one mol of morpholine is treated with one mol of sodium hydroxide in aqueous solution and one mol of carbon disulfide and the reaction mixture is then acidified with hydrochloric acid, the morpholine salt of the di-thiocarbamic acid of morpholine is precipitated out as a white insoluble compound.

The following examples serve to illustrate the method of carrying out the reaction, but are not to be construed as limitations on the method.

Example 1

One hundred grams of morpholine was dissolved in 100 g. of $H_2O$ with the evolution of considerable heat. After the solution had cooled, 44 grams plus a slight excess of carbon disulfide was added slowly thru a reflux condenser. A reaction was evident, considerable heat was developed, and the reaction mixture became practically solid with the precipitated material. This precipitate was found by analysis to have a sulfur content agreeing closely with the theoretical sulfur content of the morpholine salt of the di-thiocarbamic acid of morpholine.

Example 2

One hundred grams of morpholine was dissolved in 100 cc. of water with the evolution of considerable heat. After the solution had cooled, 88 grams plus a slight excess of carbon disulfide was added slowly through a reflux condenser. A reaction was evident, considerable heat was developed and the reaction mixture became practically solid with precipitated material. This precipitate was found by analysis to have a sulfur content agreeing closely with the theoretical sulfur content of the morpholine salt of the di-thiocarbamic acid of morpholine.

*Example 3*

Twenty-five grams of morpholine was dissolved in 100 cc. of water containing 11.5 g. of sodium hydroxide. After the solution had cooled 22 grams of carbon disulfide was added slowly. No reaction was apparent. The reaction mixture was then heated on the steam bath under a reflux condenser. A reaction took place resulting in a clear yellow solution. This solution was then acidified with HCl and a white precipitate formed. This precipitate was found by analysis to have a sulfur content agreeing closely with the theoretical sulfur content of the morpholine salt of the di-thiocarbamic acid of morpholine.

Evidence that the products of the reactions are the morpholine salts of the di-thiocarbamic acid of morpholine is given by the facts that the sulfur content is in close agreement with the theoretical, and that the compound when treated with zinc chloride gives a zinc di-thiocarbamate salt whose zinc and sulfur content are both in close agreement with the theoretical.

I have also found that my new compound is useful as an insecticide when tested by the jar method against the screw worm in lethal dosage ranging between .166% to .333%, and at .333% a 100% kill was obtained.

Having thus described my invention, what I claim for Letters Patent is:

I claim:

An insecticide containing as its essential active ingredient the morpholine salt of the di-thiocarbamic acid of morpholine.

ROSCOE H. CARTER.